US008891723B2

(12) United States Patent
Reyes, Jr. et al.

(10) Patent No.: US 8,891,723 B2
(45) Date of Patent: Nov. 18, 2014

(54) STABLE STARTUP SYSTEM FOR A NUCLEAR REACTOR

(75) Inventors: Jose N. Reyes, Jr., Corvallis, OR (US); John T. Groome, Corvallis, OR (US); Qiao Wu, Portland, OR (US); Brian G. Woods, Corvallis, OR (US); Todd S. Palmer, Corvallis, OR (US)

(73) Assignee: State of Oregon Acting by and Through The State Board of Higher Education on Behalf or Oregon State University, The Oregon State University, Corvallis, OR (US)

( * ) Notice: Subject to any disclaimer, the term of this patent is extended or adjusted under 35 U.S.C. 154(b) by 874 days.

(21) Appl. No.: 12/136,625

(22) Filed: Jun. 10, 2008

(65) Prior Publication Data

US 2009/0129532 A1    May 21, 2009

Related U.S. Application Data

(60) Provisional application No. 60/988,382, filed on Nov. 15, 2007.

(51) Int. Cl.
  *G21C 15/00* (2006.01)
  *G21C 1/08* (2006.01)
  *G21C 15/26* (2006.01)

(52) U.S. Cl.
  CPC .... *G21C 1/08* (2013.01); *G21C 15/26* (2013.01); *G21Y 2002/207* (2013.01); *G21Y 2004/302* (2013.01); *G21Y 2004/40* (2013.01); *Y02E 30/40* (2013.01)
  USPC .......................... 376/404; 376/214; 376/247

(58) Field of Classification Search
  CPC .............. G21C 1/00; G21C 1/03; G21C 1/08; G21C 1/32; G21C 7/00; G21C 7/21; G21C 15/00; G21C 15/18; G21C 15/26; G21C 17/02; G21C 1/086; G21C 7/32; G21C 15/24; G21Y 2002/207; G21Y 2002/304; G21Y 2004/30; G21Y 2004/40
  USPC ......... 376/405, 214, 217, 207, 347, 361, 395, 376/396, 397, 398, 210, 211, 216, 220, 246, 376/259, 284, 293, 299, 221, 375, 402, 406, 376/247, 404
  See application file for complete search history.

(56) References Cited

U.S. PATENT DOCUMENTS 3,151,034 A * 9/1964 Douglass, Jr. et al. ........ 376/395
3,213,833 A * 10/1965 Cunningham et al. .......... 122/34
(Continued)

FOREIGN PATENT DOCUMENTS

JP    60-69598 A    4/1985
JP    4188096        7/1992
(Continued)

OTHER PUBLICATIONS

Modro, S.M., et al.; 'Multi-Application Small Light Water Reactor Final Report; Idaho National Engineering and Environmental Laboratory; Dec. 2003; Idaho Falls, ID, U.S.A.

(Continued)

*Primary Examiner* — Jack W Keith
*Assistant Examiner* — Julia Prendergast
(74) *Attorney, Agent, or Firm* — Stolowitz Ford Cowger LLP

(57) ABSTRACT

A nuclear reactor module includes a reactor vessel containing coolant, a reactor core submerged in the coolant, and a heat exchanger configured to remove heat from the coolant. The nuclear reactor module further includes one or more heaters configured to add heat to the coolant during a startup operation and prior to the reactor core going critical.

18 Claims, 8 Drawing Sheets

(56) References Cited

U.S. PATENT DOCUMENTS

| | | | |
|---|---|---|---|
| 3,397,114 A * | 8/1968 | Deighton | 376/291 |
| 3,401,082 A * | 9/1968 | Ammon et al. | 376/307 |
| 3,434,926 A * | 3/1969 | Tetsuichiro | 376/376 |
| 3,599,589 A | 8/1971 | Busey | |
| 3,865,688 A | 2/1975 | Kleimola | |
| 4,243,487 A * | 1/1981 | Schweiger | 376/298 |
| 4,734,249 A | 3/1988 | Utamura et al. | |
| 4,877,574 A * | 10/1989 | Suzuki et al. | 376/216 |
| 5,087,408 A | 2/1992 | Tominaga et al. | |
| 5,089,218 A * | 2/1992 | Gardner et al. | 376/406 |
| 5,102,616 A * | 4/1992 | Gardner et al. | 376/282 |
| 5,202,084 A * | 4/1993 | Fennern et al. | 376/433 |
| 5,271,044 A * | 12/1993 | Hidaka et al. | 376/214 |
| 5,276,720 A | 1/1994 | Oosterkamp et al. | |
| 5,580,241 A * | 12/1996 | Koeberle | 432/58 |
| 6,139,810 A * | 10/2000 | Gottzmann et al. | 422/608 |
| 6,259,760 B1 * | 7/2001 | Carelli et al. | 376/346 |
| 6,718,001 B2 * | 4/2004 | Hidaka et al. | 376/283 |
| 6,795,518 B1 | 9/2004 | Conway et al. | |
| 6,932,958 B2 * | 8/2005 | Wangerow et al. | 423/652 |
| 2011/0200155 A1 | 8/2011 | Fushimi et al. | |
| 2013/0182808 A1 | 7/2013 | Reyes, Jr. et al. | |

FOREIGN PATENT DOCUMENTS

| | | | |
|---|---|---|---|
| JP | 5072375 | 3/1993 | |
| JP | 5209979 | 8/1993 | |
| JP | 6265665 | 9/1994 | |
| JP | 2002-350583 | * 12/2002 | G21C 15/26 |
| JP | 2002350583 | 12/2002 | |
| JP | 2004101492 | 4/2004 | |
| JP | 2004309039 | 11/2004 | |
| JP | 2007-232503 | * 9/2007 | G21C 17/02 |
| JP | 2007232503 | 9/2007 | |
| KR | 10-1261518 | 4/2013 | |
| WO | 2007136261 A1 | 11/2007 | |
| WO | 2009097033 | 8/2009 | |

OTHER PUBLICATIONS

Iaea; Iaea Tecdoc 1391—Status of Advanced Light Water Reactor Designs 2004; May 2004; pp. 279-306, 489-512; Nuclear Power Technology Development Section, International Atomic Energy Agency; Vienna; Austria.

Iaea; Iaea Tecdoc 1485—Status of Innovative Small and Medium Sized Reactor Designs 2005; Mar. 2006; pp. 93-162; Nuclear Power Technology Development Section, International Atomic Energy Agency; Vienna; Austria.

European Patent Office, International Search Report and Written Opinion, Jan. 10, 2009.

Canadian Patent Office, Official Action for App. No. 2705471, dated Jan. 15, 2013, 5 pages.

Stolowitz Ford Cowger LLP, "Listing of Related Cases", Jan. 15, 2013, 1 page.

European Patent Office, International Preliminary Report on Patentability for PCT/US2008/082834, May 27, 2010, 10 pages.

* cited by examiner

PRIOR ART

STABLE STARTUP SYSTEM FOR A NUCLEAR REACTOR

CROSS-REFERENCE TO RELATED APPLICATIONS

This application claims priority to U.S. Provisional Application Ser. No. 60/988,382, filed on Nov. 15, 2007, the specification of which is herein incorporated by reference in its entirety.

BACKGROUND

In nuclear reactors designed with passive operating systems, the laws of physics are employed to ensure that safe operation of the nuclear reactor is maintained during normal operation or even in an emergency condition without operator intervention or supervision, at least for some predefined period of time. A Multi-Application Small Light Water Reactor project conducted with the assistance of the Idaho National Engineering and Environmental Laboratory, NEX-ANT and the Nuclear Engineering Department of Oregon State University sought to develop a safe and economical natural light water reactor. FIG. 1 illustrates a nuclear reactor design 5 that resulted from this project.

The nuclear reactor design 5 includes a reactor core 6 surrounded by a reactor vessel 2. Water 10 in the reactor vessel 2 surrounds the reactor core 6. The reactor core 6 is further located in a shroud 22 which surround the reactor core 6 about its sides. When the water 10 is heated by the reactor core 6 as a result of fission events, the water 10 is directed from the shroud 22 and out of a riser 24. This results in further water 10 being drawn into and heated by the reactor core 6 which draws yet more water 10 into the shroud 22. The water 10 that emerges from the riser 24 is cooled down and directed towards the annulus 23 and then returns to the bottom of the reactor vessel 2 through natural circulation. Pressurized steam 11 is produced in the reactor vessel 2 as the water 10 is heated.

A heat exchanger 35 circulates feedwater and steam in a secondary cooling system 30 in order to generate electricity with a turbine 32 and generator 34. The feedwater passes through the heat exchanger 35 and becomes super heated steam. The secondary cooling system 30 includes a condenser 36 and feedwater pump 38. The steam and feedwater in the secondary cooling system 30 are isolated from the water 10 in the reactor vessel 2, such that they are not allowed to mix or come into direct contact with each other.

The reactor vessel 2 is surrounded by a containment vessel 4. The containment vessel 4 is placed in a pool of water 16. The pool of water 16 and the containment vessel 4 are below ground 9 in a reactor bay 7. The containment vessel 4 is designed so that water or steam from, the reactor vessel 2 is not allowed to escape into the pool of water 16 or the surrounding environment. In an emergency situation, steam 11 is vented from the reactor vessel 2 through a steam valve 8 into an upper half 14 of the containment vessel 4, and water 10 flashes as it is released through a submerged blowdown valve 18 which is located in a suppression pool 12. The suppression pool 12 includes sub-cooled water.

The nuclear physics and thermal hydraulics of a natural circulation nuclear power reactor are tightly coupled. The reactor core 6 generates the heat that creates the buoyancy needed to drive the flow through the loop. The flowing water in the reactor vessel 2 serves both as the reactor core coolant and as the fluid moderator that slows down the neutrons produced by the fission process in the reactor core 6. The fluid moderator temperature strongly affects the nuclear fission process that generates the heat in the reactor core 6. In turn, the fluid moderator temperature is governed by the reactor core power and fluid flow rate.

The tight coupling between the nuclear physics and the thermal hydraulics makes startup of a natural circulation nuclear reactor potentially unstable when the control rods are withdrawn to achieve core criticality to the point of adding heat to the fluid.

The present invention addresses these and other problems.

SUMMARY

A stable startup system is herein disclosed as including a reactor core housed in a reactor vessel, and a heat sink configured to remove heat from the reactor vessel. The stable startup system further includes an electrically powered heater configured to add heat to the reactor vessel prior to an initialization of the reactor core.

A nuclear reactor module is herein disclosed as including a reactor vessel containing coolant, a reactor core submerged in the coolant, and a heat exchanger configured to remove heat from the coolant. The nuclear reactor module further includes one or more heaters configured to add heat to the coolant during a startup operation and prior to the reactor core going critical.

A method of startup for a nuclear reactor is herein disclosed, wherein the method includes activating a heating system to increase a temperature of a primary coolant. The method also includes removing heat from the primary coolant, wherein a difference in liquid density results in natural circulation of the primary coolant through a reactor core. The method further includes deactivating the heating system and initializing the reactor core to achieve criticality.

DETAILED DESCRIPTION

Passive reactor systems, including those that rely on natural circulation, have a reduced number of mechanical moving devices, motors, pumps and connections compared to conventional systems that might require servicing or continual maintenance during the life of the reactor. A certain level of maintenance of the reactor may be acceptable when the fuel is changed, or during a mid-point of the reactor life. However, by reducing or eliminating the number of maintenance periods the reactor may be made operational for longer durations thereby increasing efficiency and effectively reducing the cost of the energy that it produces.

Figure 2:
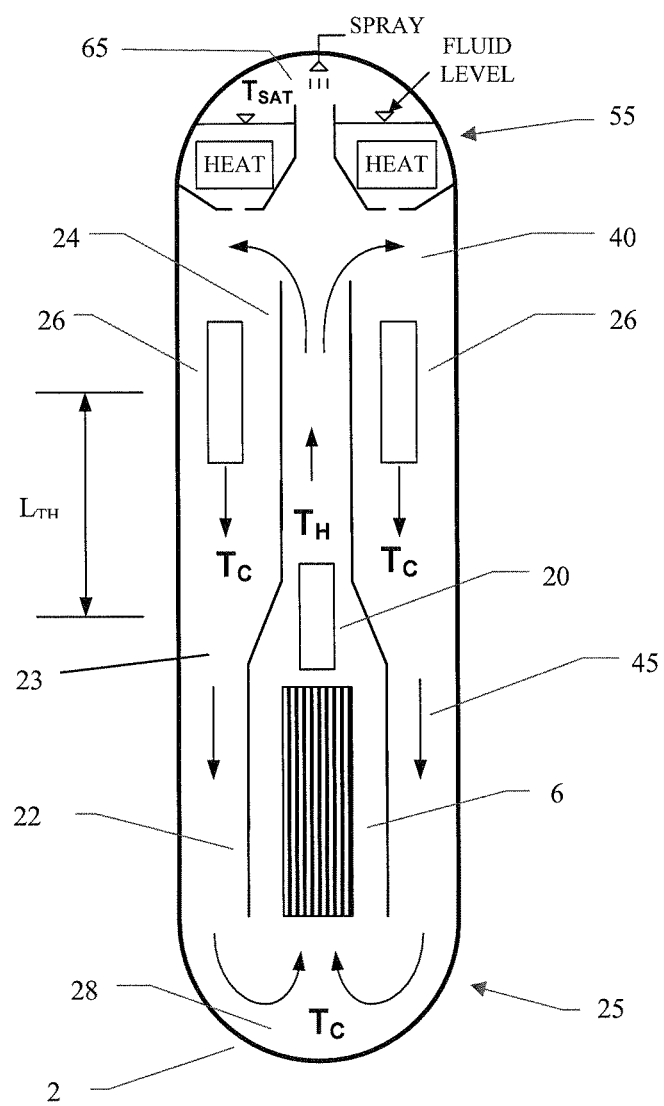
FIG. 2 illustrates a novel power module assembly including a stable startup system.

FIG. 2 illustrates a novel power module assembly 25 including a stable startup system 20. The stable startup system 20 may generate heat to provide initial fluid flow and establish operating temperature and pressure conditions for the power module assembly 25. In one embodiment, the operating temperature may be about 289 degrees Celsius. The power module assembly 25 may rely on natural circulation for normal cooling of its reactor core 6. Natural circulation of the coolant within the power module assembly 25 occurs due to the differences in temperature of the coolant 45 as it is being simultaneously heated by the reactor core 6 and cooled by a heat sink 26 during operation. In one embodiment, the heat sink 26 comprises a heat exchanger.

Experiments conducted at Oregon State University demonstrated that startup of a natural circulation nuclear reactor may cause a large slug of cold water to enter the reactor core 6 while at critical conditions. The rapid temperature reduction in the fluid moderator, or coolant 45, may result in a rapid increase in reactor core power or a power excursion when control rods are initially removed from the reactor core 6. If the power excursion is too great the control rods may be lowered, decreasing the amount of heat generated by the reactor core 6. A cyclical removal and insertion of the control rods increases the complexity and time required to reach operating temperatures, and ultimately leads to a longer startup period as well as additional supervision during operation of the power module assembly 25.

Prior to startup of the power module assembly 25, the reactor core 6 may be in a cold shutdown condition with control rods inserted. A pressurizer system 55 may be provided to increase system pressure by promoting local boiling of fluid in the upper head space 65 of the power module assembly 25. The increased system pressure permits the coolant 45 flowing through the reactor core 6 to reach operation temperature without bulk boiling in the flow path. The pressurizer system 55 may include one or more heaters and sprays. The heaters may be covered with fluid, such as water, to promote the generation of steam. In one embodiment, the pressurizer system 55 does not include a spray. Lower operating pressures of the reactor system and higher pressure limits of the reactor vessel 2 may allow the power module assembly 25 to moderate the pressure level without a spray.

The stable startup system 20 may be activated or energized to add heat to the coolant 45. In one embodiment the coolant 45 comprises water. The coolant 45 that flows up through the riser 24 is warmed by the stable startup system 20. The one or more heat sinks 26 are configured to remove heat from the coolant 45. By locating the stable startup system 20 at an elevation below the one or more heat sinks 26, a buoyancy force is created that drives warm coolant $T_H$ UP through the shroud 22 and riser 24. The coolant 45 that flows through the one or more heat sinks 26 is relatively cold compared to the warm coolant $T_H$. The cold coolant $T_C$ flows down through the annulus 23 into the lower plenum 28 of the reactor vessel 2. This creates a density difference between the warm coolant $T_H$ in the riser 24 and the cold coolant $T_C$ in the annulus 23, further creating a fluid flow 40 through the reactor core 6. The rate of heat removal by the heat sink 26 versus the rate of heat addition by the stable startup system 20 may be used to control the coolant temperature in the reactor core 6 during startup of the power module assembly 25.

The stable startup system 20 may be configured to generate fluid flow through the reactor core 6 without withdrawing control rods, thereby avoiding a nuclear power excursion during reactor startup. The stable startup system 20 may include a set of heaters, for example in the pressurizer system 55, that are isolated from the main flow path 40, to provide pressure control for reactor startup. Depending on the start-up system configuration, the heaters can also serve to increase coolant temperature. The stable startup system 20 can also include sets of heaters located in the riser 24 or shroud 22, and at various elevations below the heat sink 26. The heat sink 26 may be located outside of the riser 24 or shroud 22 regions. The density difference created by the stable startup system 20 and the heat sink 26, coupled with the elevation difference $L_{TH}$, provides a buoyancy force that drives a natural circulation flow 40 through the reactor core 6.

Evaluation of Cold Water Injection Transient During Startup

The stable startup system 20 of FIG. 2 provides heating power for the initiation of natural circulation in the reactor primary coolant system. The effect of an instantaneous change in the temperature of the coolant inlet of the power module assembly 6 may be modeled at a variety of startup power ranges. Analyzing the range between 1% power and 20% power, the data for multiple simulations is listed in the tables below.

TABLE 1

Initial conditions for cold water insertion transients.

| % Power | Power Density (MW/m³) | $T_f$ (C.) | $T_m$ (C.) | $T_m0$ (C.) |
|---|---|---|---|---|
| 1 | 1.89 | 30.5 | 17.92 | 16.91 |
| 2 | 3.78 | 45.6 | 20.41 | 18.39 |
| 4 | 7.56 | 75.9 | 25.47 | 21.44 |
| 6 | 11.34 | 106. | 30.67 | 24.62 |
| 8 | 15.12 | 137. | 36.05 | 27.99 |
| 10 | 18.89 | 168. | 41.60 | 31.53 |
| 12 | 22.67 | 199. | 47.37 | 35.28 |
| 14 | 26.45 | 230. | 53.35 | 39.24 |
| 16 | 30.23 | 261. | 59.59 | 43.47 |
| 18 | 34.01 | 293. | 66.12 | 47.98 |
| 20 | 37.79 | 325. | 72.96 | 52.81 |

The energy conservation equation and the integrated momentum equation may be used to determine the flow rates and heat-up rates that can be achieved. Initial conditions may be selected such that the reactor core 6 is in a steady-state or critical operating condition. A six-group delayed neutron treatment was used in the simulations described herein, assuming data solely for the fissile isotope $^{235}$U. Values of reactivity coefficients may be chosen to be representative of standard light water reactor fuel.

Estimating Startup Flow Rates

Changes in the natural circulation flow rate may occur over a slow time scale. Therefore, the steady-state solution of the momentum equation integrated along the loop axis is suitable for this analysis. It basically provides a balance between friction force and buoyancy force due to density variations in the heating/cooling loop. The resulting fluid velocity in the reactor core can be expressed as:

$$u_{co} = \left[\frac{\beta q_{in} L_{th} g}{\rho a_c C p R_F}\right]^{1/3}$$

where:
$u_{co}$ coolant velocity in the reactor core 6
$\beta$ thermal expansion coefficient of coolant 45
$q_{in}$ heating rate
$L_{th}$ center distance between the heater and the cooler
g gravitational constant
p liquid density $a_c$ liquid flow area in the reactor core
$C_p$ heat capacity of fluid
$R_f$ dimensionless loop resistance Table 2 demonstrates example numerical results for the mass flow rate and coolant velocity as functions of the heating power. It may be determined that 19% of the nominal core flow rate can be established using a stable startup system including 1 MW heaters.

TABLE 2

Heating power versus coolant flow rate and velocity

| $q_{in}$(MW) | $u_{co}$ (m/s) | Mass Flow Rate (kg/s) |
| --- | --- | --- |
| 5 | 0.166 | 136.46 |
| 4.8 | 0.164 | 134.61 |
| 4.6 | 0.162 | 132.72 |
| 4.4 | 0.159 | 130.76 |
| 4.2 | 0.157 | 128.75 |
| 4 | 0.154 | 126.67 |
| 3.8 | 0.152 | 124.53 |
| 3.6 | 0.150 | 122.30 |
| 3.4 | 0.146 | 119.99 |
| 3.2 | 0.143 | 117.59 |
| 3 | 0.140 | 115.09 |
| 2.8 | 0.137 | 112.47 |
| 2.6 | 0.133 | 109.73 |
| 2.4 | 0.130 | 106.84 |
| 2.2 | 0.126 | 103.79 |
| 2 | 0.122 | 100.54 |
| 1.8 | 0.118 | 97.07 |
| 1.6 | 0.114 | 93.33 |
| 1.4 | 0.109 | 89.27 |
| 1.2 | 0.103 | 84.80 |
| 1 | 0.097 | 79.80 |
| 0.8 | 0.090 | 74.08 |
| 0.6 | 0.082 | 67.31 |
| 0.4 | 0.072 | 58.80 |
| 0.2 | 0.057 | 46.67 |
| 0 | 0 | 0.00 |

Figure 3A:
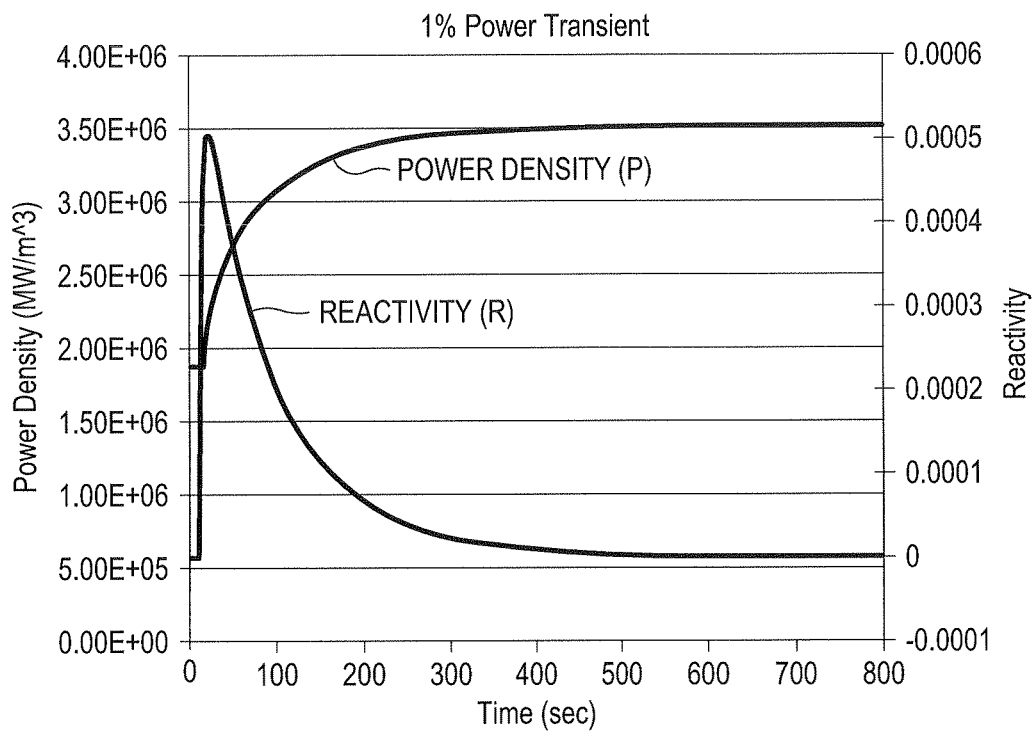
FIGS. 3A and 3B illustrate a rate of change of operating conditions for a first example power transient.
Figure 3B:
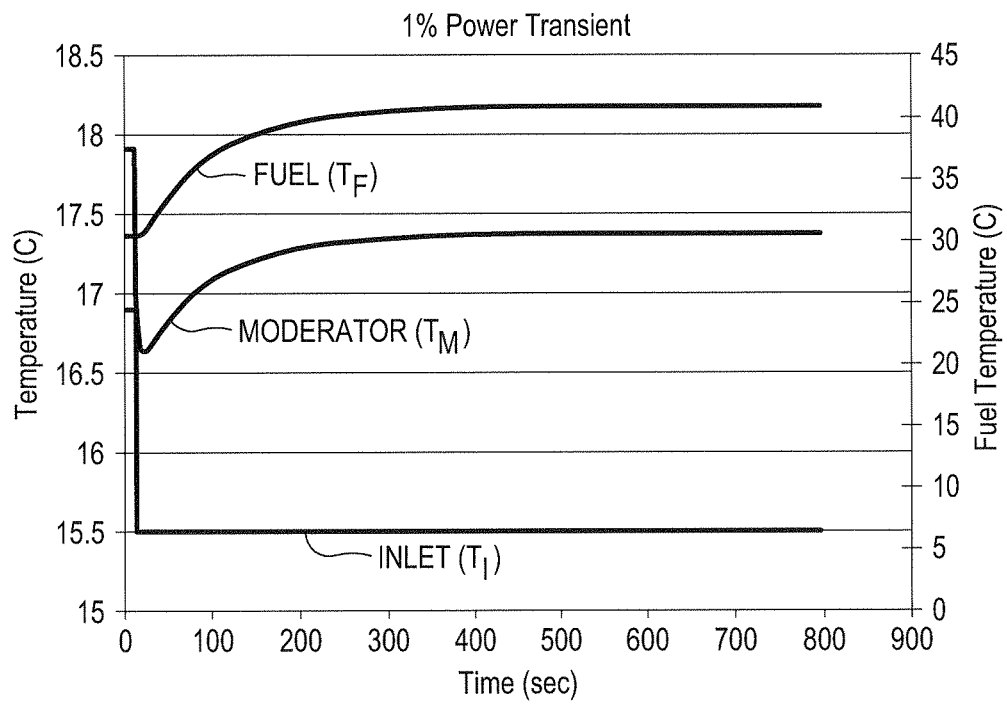
Figure 4A:
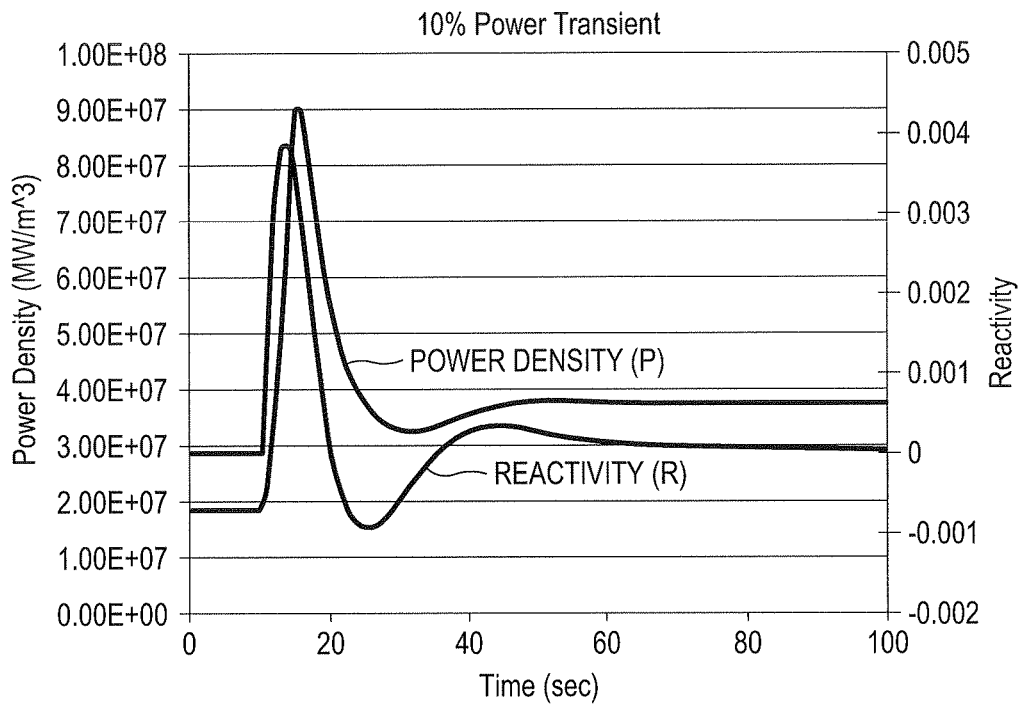
FIGS. 4A and 4B illustrate a rate of change of operating conditions for a second example power transient.
Figure 4B:
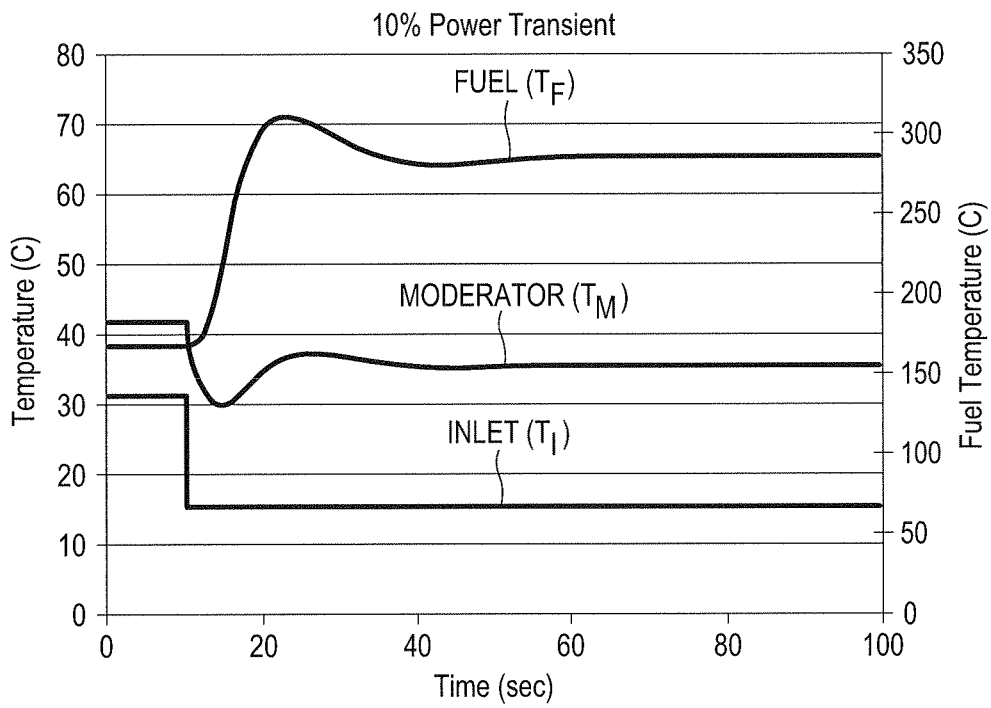
Figure 5A:
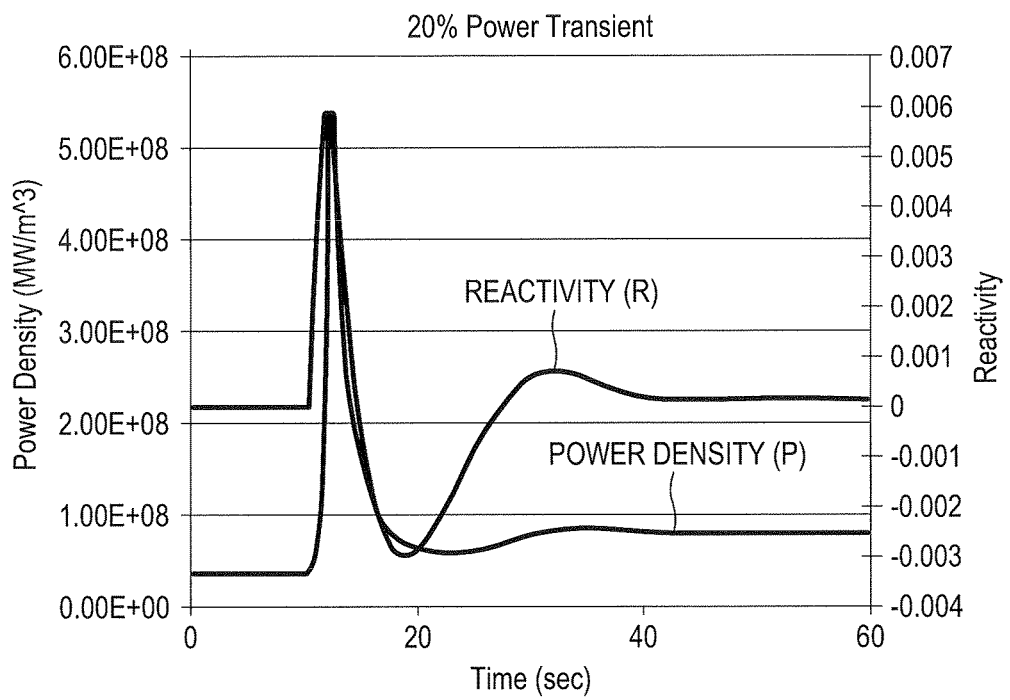
FIGS. 5A and 5B illustrate a rate of change of operating conditions for a third example power transient.
Figure 5B:
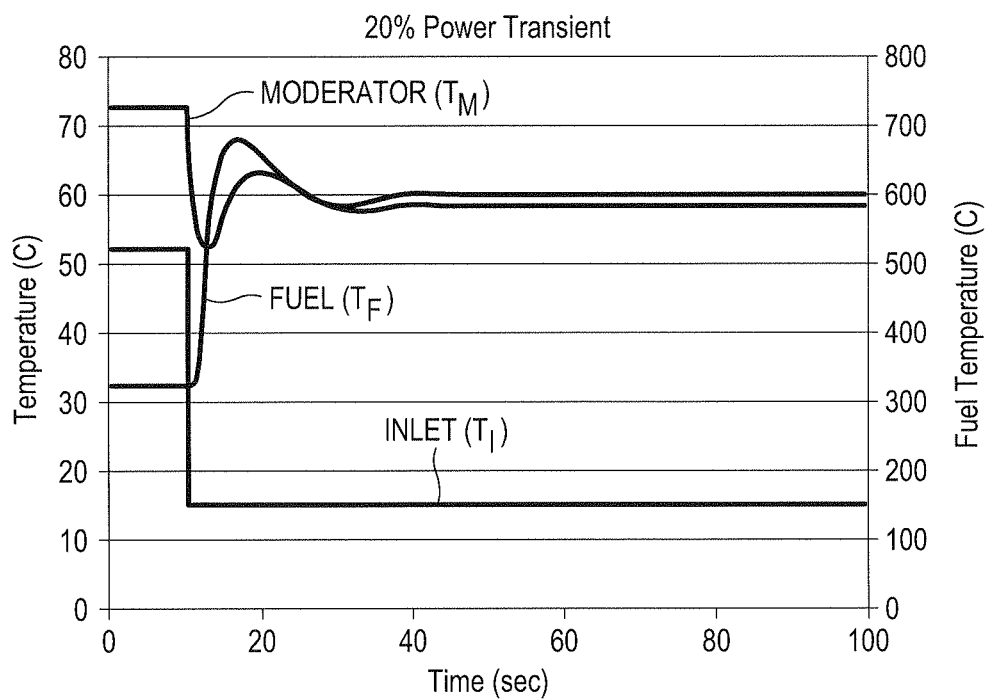

FIGS. 3A and 3B illustrate a rate of change of operating conditions for a first example power transient of 1%. FIGS. 4A and 4B illustrate a rate of change of operating conditions for a second example power transient of 10%. FIGS. 5A and 5B illustrate a rate of change of operating conditions for a third example power transient of 20%. For the different example power transients of FIGS. 3-5, curves for power density P and reactivity R of the reactor are shown in FIGS. 3A, 4A and 5A, and curves for moderator temperature $T_M$, inlet temperature $T_1$ and fuel temperature $T_F$ are shown in FIGS. 3B, 4B and 5B.

Table 3 illustrates a stable startup system heat up transient over a 24 hour period of time.

TABLE 3

Startup system heat up transient

| t (hrs) | T - Degrees C. |
| --- | --- |
| 0 | 20.0 |
| 1 | 31.0 |
| 2 | 41.9 |
| 3 | 52.9 |
| 4 | 63.9 |
| 5 | 74.9 |
| 6 | 85.8 |
| 7 | 96.8 |
| 8 | 107.8 |
| 9 | 118.7 |
| 10 | 129.7 |
| 11 | 140.7 |
| 12 | 151.7 |
| 13 | 162.6 |
| 14 | 173.6 |
| 15 | 184.6 |
| 16 | 195.6 |
| 17 | 206.5 |
| 18 | 217.5 |
| 19 | 228.5 |
| 20 | 239.4 |
| 21 | 250.4 |
| 22 | 261.4 |
| 23 | 272.4 |
| 24 | 283.3 |

The example simulations illustrated in FIGS. 3-5 clearly show that a slug of cold water introduced into the reactor core 6 causes a reactivity increase (due to a negative moderator temperature coefficient), which then initiates a damped power excursion. For low initial powers, no significant oscillations are observed, and the reactor core 6 undergoes a smooth and relatively small (~factor of 2) increase in power. For larger initial powers and relatively cooler water slugs, the power density P and reactivity R changes are relatively large, and the transient occurs over a much shorter time scale. In the 5% power case, the cold water insertion causes power density P to increase by a factor of 14, and reactivity R reaches 85% of prompt supercritical. In this case, the fuel temperature $T_F$ also increases by nearly a factor of 2 in approximately 5 seconds. Gradually heating up the coolant 45 before pulling control rods will minimize the effect of this type of transient.

Figure 6:
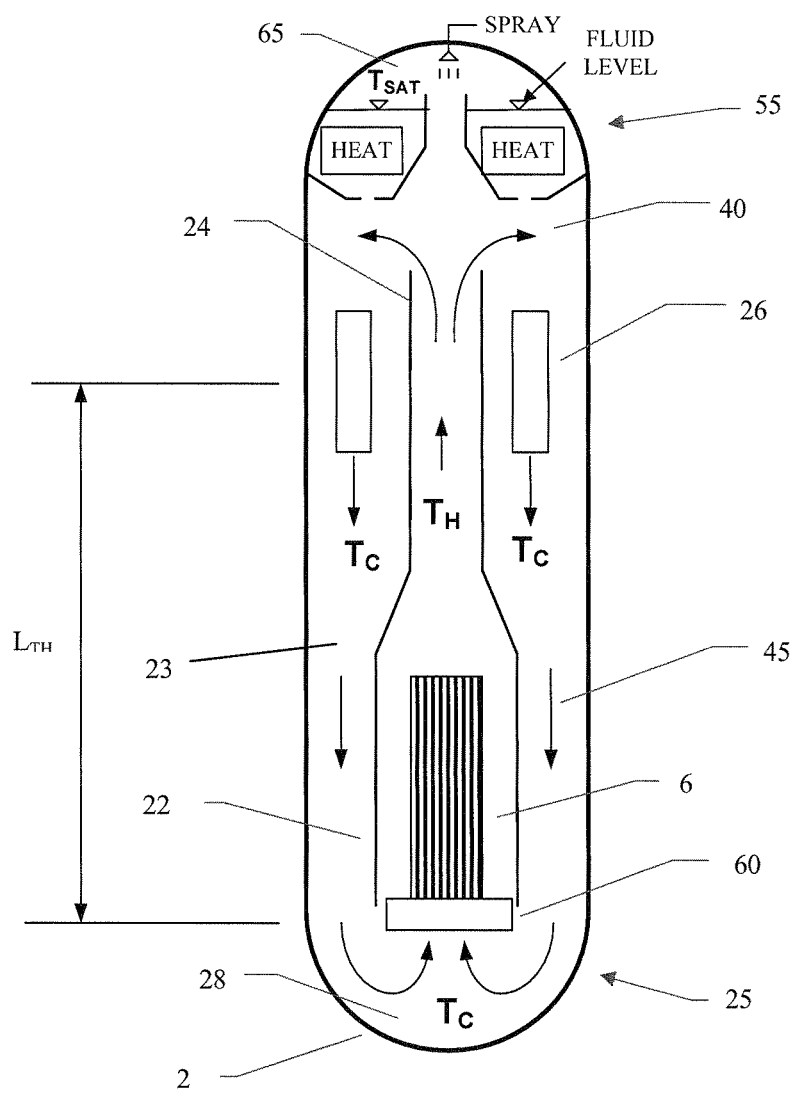
FIG. 6 illustrates a further embodiment of a stable startup system.

FIG. 6 illustrates a further embodiment of a stable startup system 60. The operation of the system is similar to the embodiment described with respect to FIG. 2, but the stable startup system 60 is located under the reactor core 6. Locating the stable startup system 60 below the reactor core 6 prevents cold coolant $T_C$ from entering the reactor core 6 which might otherwise result in reactivity insertion. Also, by locating the stable startup system 60 below the reactor core 6, more space may be made available for operation of the control rods that occupy a portion of the riser 24. A stronger circulation results due to the maximized elevation difference $L_{TH}$ between the stable startup system 60 and the heat sink 26.

The stable startup system 60 may include one or more heaters positioned below the reactor core 6. The heaters may be electric heaters. Prior to startup of the power module assembly 25, the reactor core 6 may be in a cold shutdown condition with control rods inserted. The one or more heat sinks 26 are configured to remove heat from the coolant 45. The pressurizer system 55 may be configured to increase a system pressure in the reactor vessel 2 by local boiling of fluid (e.g. water) in the upper head space 65 of the reactor vessel 2. The increased pressure permits the coolant 45 in the reactor vessel 2 to reach operation temperature without bulk boiling in the flow path 40.

The stable startup system 60 may be initiated to create a density difference between the coolant in the riser 24 and the coolant in the annulus 23. By locating the heaters of the stable startup system 60 at an elevation below the heat sink 26, a buoyancy force may be created that drives warm coolant $T_H$ up through the shroud 22 and riser 24 and cold coolant $T_C$ down through the annulus 23 into the lower plenum 28. This creates a natural circulation flow through the reactor core 6. The rate of heat removal by the heat sink 26 versus the rate of heat addition by the stable startup system 60 may be used to control the coolant temperature in the reactor core 6. The differential in heat addition to heat removal increases the fluid temperature to operating conditions.

Figure 7:
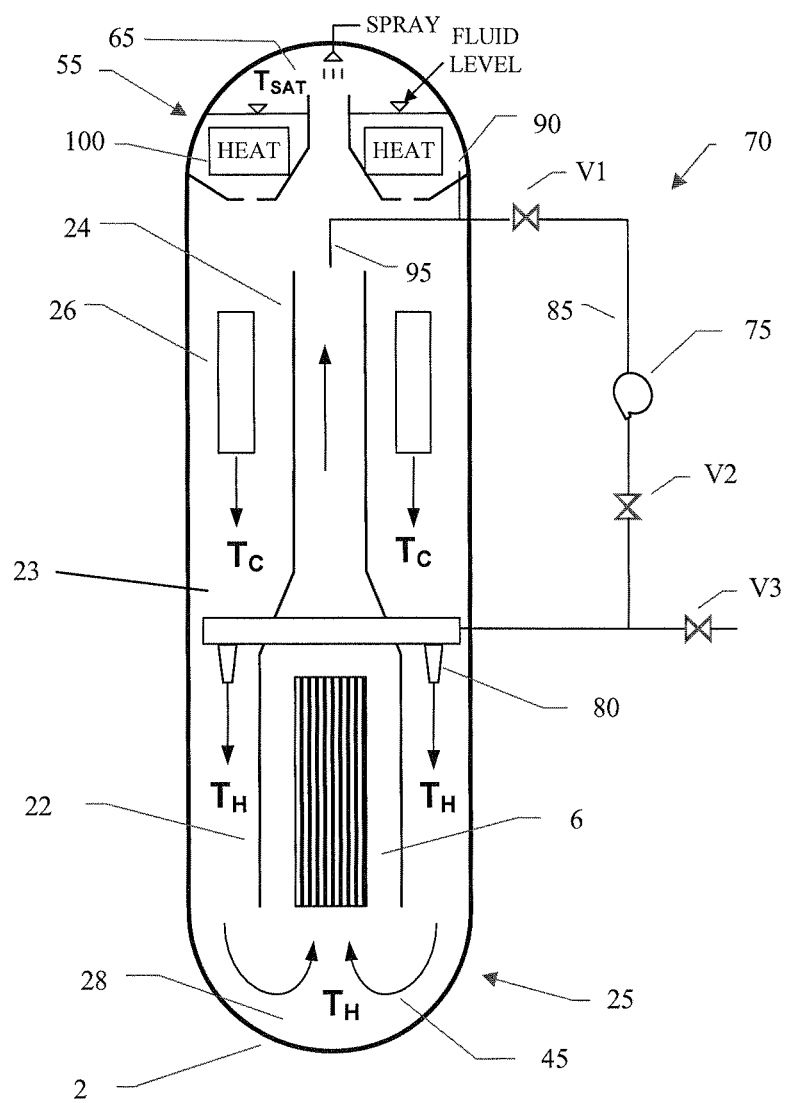
FIG. 7 illustrates yet another embodiment of a stable startup system.

FIG. 7 illustrates yet another embodiment of a stable startup system 70 wherein a circulation pump 75 is employed. The circulation loop 85 may include the existing Chemical and Volume Control System (CVCS) and the pressurizer system 55. The circulation pump 75 and an extraction line 90 partially draw hot fluid from the pressurizer system 55 located at the upper head space 65 of the reactor vessel 2. The stable startup system 70 may also include valves V1, V2, V3 and one or more nozzles 80 to control the flow of coolant in the circulation loop 85 and deliver the hot coolant $T_H$ to the annulus 23.

The nozzles 80 may be injection or inductor nozzles, for example. Heating up the primary coolant system may be done by the heaters 100 in the pressurizer system 55. In one embodiment, the circulation pump 75 and circulation loop 85 are located external to the reactor vessel 2. In another embodiment, one or both of the circulation pump 75 and circulation loop 85 are located within the reactor vessel 2. The circulation pump 75 may increase the rate of coolant flow within the reactor vessel 2 to be greater than that provided by natural circulation alone. In one embodiment, a pressurizer system is located in the lower plenum 28 of the reactor vessel 2, and steam is piped to the upper head space 65.

Prior to startup of the power module assembly 25, the reactor core 6 may be in a cold shutdown condition with its control rods inserted. The one or more heat sinks 26 may be configured to remove heat from the coolant 45. The pressurizer system 55 may be configured to increase a system pressure in the reactor vessel 2 by local boiling of fluid (e.g. water) in the upper head space 65 of the reactor vessel 2. The increased pressure permits the coolant 45 in the reactor vessel 2 to reach operation temperature without bulk boiling in the flow path 40. The circulation pump 75 initiates an internal circulation within the reactor vessel 2 by pumping coolant 45 out of one or both of the pressurizer system 55 and the riser 24 via extraction lines 90, 95 and then injects the coolant 45 back in the annulus 23 through the one or more nozzles 80. The one or more nozzles 80 may be configured to expel the hot coolant $T_H$ at an elevation below the heat sink 26. In one embodiment, the circulation loop 85 utilizes existing CVCS distribution lines or pipes. In one embodiment, the circulation pump 75 is a CVCS pump.

Hot fluid in the pressurizer system 55 joins the circulation loop 85, heating up the coolant 45 in the primary coolant system to the nominal or operating temperature. The rate of heat removal by the heat sink 26 versus the rate of heat addition by the stable startup system 70 may be used to control the coolant temperature in the reactor core 6. When the coolant 45 in the power module assembly 25 reaches operating pressure and temperature, control rods start to withdraw from the reactor module 6. The increasing heat removal rate from the heat sink 26 balances the power production rate, leading to the full power condition when the flow of coolant 45 through the circulation loop 85 can be steadily terminated.

Figure 8:
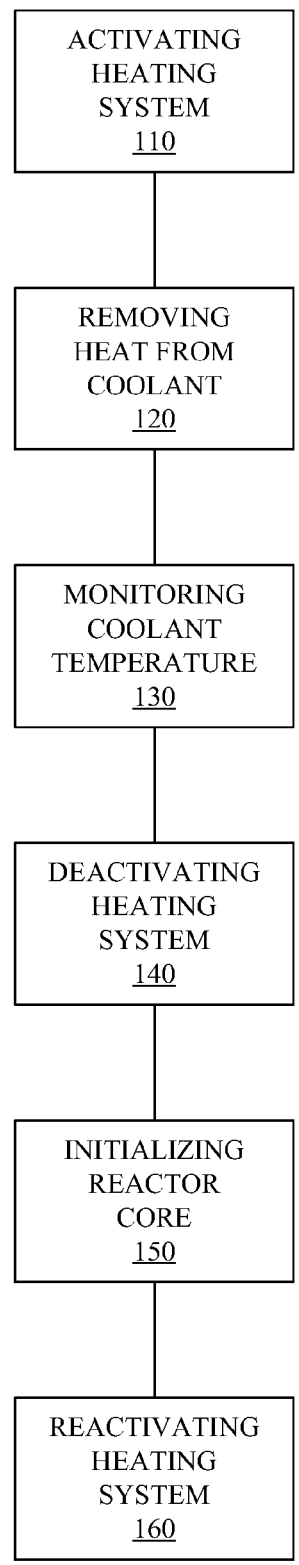
FIG. 8 illustrates a method of operation of a stable startup system.

FIG. 8 illustrates a method of operation of a stable startup system, such as the example stable startup systems 20, 60, 70 described with respect to FIGS. 2, 6 and 7. At operation 110, the heating system is activated to increase a temperature of a primary coolant such as coolant 45 of FIG. 2. In one embodiment, the primary coolant is heated by a heating system comprised of one or more electric heaters. The heating system may be located below the reactor core 6. In another embodiment, the heating system is located above the reactor core.

At operation 120, heat is removed from the primary coolant, wherein a difference in liquid density results in natural circulation of the primary coolant through the reactor core. In one embodiment, the heat is removed from the primary coolant by a heat exchanger.

At operation 130, the temperature of the primary coolant is monitored. The heating system is deactivated after the coolant has achieved an operating temperature. In one embodiment, the operating temperature identifies a coolant temperature associated with a low power steady state condition of the reactor core.

At operation 140, the heating system is deactivated. Where the heating system includes electric heaters, the heating system may be deactivated by removing the flow of current to the heaters.

At operation 150, the reactor core is initialized to achieve criticality. The reactor core may be initialized, or activated, by removing control rods to increase the rate of fission events. In one embodiment, the reactor core is initialized after the heater is deactivated. In another embodiment, the reactor core is initialized before the heater is deactivated.

At operation 160, the heating system is reactivated to control an operating pressure of the nuclear reactor after the reactor core has achieved criticality. The heating system may be reactivated after the reactor has been operating at steady state for a period of time. The heating system may be reactivated to increase the pressure within the reactor vessel.

Figure 1:
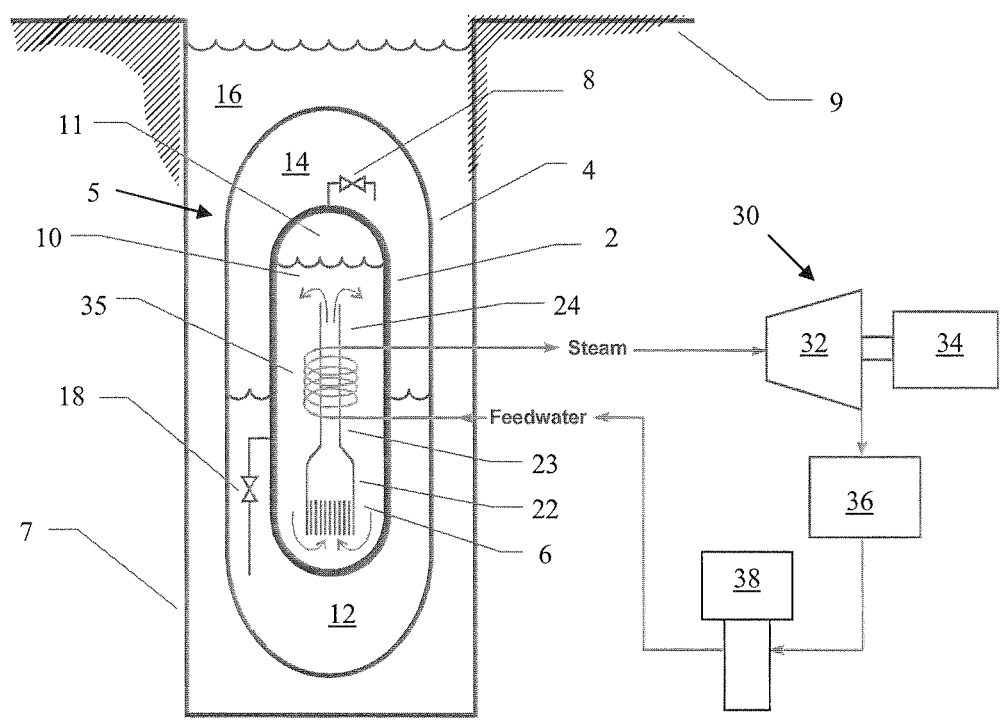
FIG. 1 illustrates a nuclear power system known in the art.

The power module assembly 25 of FIGS. 2, 6 and 7 may be configured to operate in a containment vessel and in a submerged pool of water such as that illustrated in FIG. 1, however the principles described herein apply to other reactor designs as well.

Although the embodiments provided herein have primarily described a pressurized light water reactor, it should be apparent to one skilled in the art that the embodiments may be applied to other types of nuclear power systems as described or with some obvious modification. For example, the embodiments or variations thereof may also be made operable with a boiling water reactor or a heavy water reactor. A boiling water reactor may require larger vessels to produce the same energy output.

The amount of heat generated by the stable startup system, the rate of change of coolant temperature, and the rate of change of power density, as well as other rates and values described herein are provided by way of example only. Other rates and values may be determined through experimentation such as construction of full scale or scaled models of the nuclear reactor.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A stable startup system for a nuclear reactor comprising:
   a pressurized reactor vessel;
   a reactor core housed in the reactor vessel, wherein the reactor core is submerged in a primary coolant of the nuclear reactor, and wherein the reactor core is located beneath a riser;
   a heat sink configured to remove heat from the primary coolant after the primary coolant has passed through the riser of the reactor vessel; and
   an electrical heater configured to add heat to the primary coolant contained within the reactor vessel prior to an initialization of the reactor core to achieve reactor criticality, wherein the heat is added by the electrical heater into the riser at an insertion point that is below the heat sink to cause a density difference in the primary coolant that drives the primary coolant through the reactor core which occurs only by the use of natural circulation prior to the initialization of the reactor core, and wherein the insertion point is above the reactor core.

2. The system according to claim 1, wherein the heat sink comprises a heat exchanger of a secondary cooling system.

3. The system according to claim 1, wherein the heat sink is located within the reactor vessel at an elevation above the reactor core.

4. The system according to claim 1, wherein the elevation of the electrical heater is above the reactor core.

5. The system according to claim 1, wherein the electrical heater is located at least partially within a shroud that surrounds the reactor core.

6. The system according to claim 1, wherein the electrical heater is further configured to control pressure within the reactor vessel after the initialization of the reactor core.

7. A nuclear reactor module comprising:
a pressurized reactor vessel containing primary coolant;
a reactor core submerged in the primary coolant;
a riser located above the reactor core;
one or more electrical heaters configured to increase a temperature of the primary coolant of the nuclear reactor module prior to an initialization of the reactor core by adding heat to the primary coolant at an insertion point is located within the riser, wherein the insertion point is located above the reactor core;
a heat exchanger configured to remove heat from the primary coolant after the primary coolant has passed through the riser, wherein the heat exchanger is located within the reactor vessel at an elevation that is above the insertion point within the riser that the heat is added, and wherein a difference in liquid density of the primary coolant within the riser and at the heat exchanger results in circulation of the primary coolant through the reactor core only by the use of natural circulation prior to the initialization of the reactor core;
means for deactivating the one or more electrical heaters; and
means for initializing the reactor core to achieve criticality.

8. The nuclear reactor module according to claim 7, wherein the one or more electrical heaters heat the primary coolant to an operating temperature that provides for the natural circulation of the primary coolant from the heat exchange to the one or more electrical heaters and through the reactor core.

9. The nuclear reactor module according to claim 8, wherein the reactor core is caused to go critical after the primary coolant reaches the operating temperature.

10. The nuclear reactor module according to claim 7, wherein the insertion point at which the one or more electrical heaters add the heat to the primary coolant is located below the heat exchanger.

11. The nuclear reactor module according to claim 7, wherein the one or more electrical heaters are further configured to control a pressure in the reactor vessel after the reactor core has gone critical.

12. A method of startup for a nuclear reactor comprising:
activating a heating system to increase a temperature of a primary coolant of the nuclear reactor prior to an initialization of a reactor core located within a pressurized reactor vessel, wherein the heating system comprises one or more electrical heaters that add heat to the primary coolant at an insertion point that is located within a riser, and wherein the insertion point is located above the reactor core;
removing heat from the primary coolant with a heat exchanger located within the reactor vessel at an elevation that is above the insertion point where the heat is added to the primary coolant in the riser,
circulating the primary coolant through the reactor core, wherein a difference in liquid density of the primary coolant in the riser and at the heat exchanger results in circulation of the primary coolant through the reactor core only by the use of natural circulation prior to the initialization of the reactor core;
deactivating the heating system; and
initializing the reactor core to achieve criticality.

13. The method according to claim 12, wherein the one or more electrical heaters are located within the reactor vessel.

14. The method according to claim 12, further comprising reactivating the heating system to control an operating pressure of the nuclear reactor after the rector core has achieved criticality.

15. The method according to claim 12, further comprising monitoring the temperature of the primary coolant, wherein the heating system is deactivated after the primary coolant has achieved an operating temperature associated with a low power steady state condition of the reactor core.

16. The method according to claim 12, wherein the one or more electrical heaters are located within the reactor vessel at an elevation that is above the reactor core.

17. The method according to claim 12, wherein the reactor core is initialized to achieve criticality after the heating system is deactivated.

18. The nuclear reactor module according to claim 7, wherein the reactor core is initialized after the one or more electrical heaters are deactivated.

* * * * *